5 Sheets—Sheet 1.

W. N. WHITELEY.
REAPING AND MOWING MACHINE.

No. 174,042. Patented Feb. 22, 1876.

5 Sheets—Sheet 2.

W. N. WHITELEY.
REAPING AND MOWING MACHINE.

No. 174,042. Patented Feb. 22, 1876.

WITNESSES
F. B. Townsend
J. S. Brown

INVENTOR
W. N. Whiteley
By R. D. Smith his Attorney

N. PETERS, PHOTO-LITHOGRAPHER, WASHINGTON, D. C.

5 Sheets—Sheet 3.

W. N. WHITELEY.
REAPING AND MOWING MACHINE.

No. 174,042. Patented Feb. 22, 1876.

WITNESSES
F. B. Townsend.
J. S. Brown.

INVENTOR
W. N. Whiteley
By R. N. Smith
His Attorney

5 Sheets—Sheet 4.

W. N. WHITELEY.
REAPING AND MOWING MACHINE.

No. 174,042. Patented Feb. 22, 1876.

WITNESSES
F. B. Townsend
J. S. Brown

INVENTOR
W. N. Whiteley
By R. S. Smith his Attorney

5 Sheets—Sheet 5.

W. N. WHITELEY.
REAPING AND MOWING MACHINE.
No. 174,042. Patented Feb. 22, 1876.

WITNESSES
F. B. Townsend
J. D. Brown

INVENTOR
Wm. N. Whiteley
By R. D. O. Smith his Attorney

N. PETERS, PHOTO-LITHOGRAPHER, WASHINGTON, D.C.

UNITED STATES PATENT OFFICE.

WILLIAM N. WHITELEY, OF SPRINGFIELD, OHIO.

IMPROVEMENT IN REAPING AND MOWING MACHINES.

Specification forming part of Letters Patent No. 174,042, dated February 22, 1876; application filed August 10, 1875.

*To all whom it may concern:*

Be it known that I, WILLIAM N. WHITELEY, of Springfield, in the county of Clarke and State of Ohio, have invented a Machine for Reaping and Mowing, of which the following is a specification:

This invention relates to that class of harvesters wherein the cutting apparatus is rigidly attached to the main frame, and motion of the operative parts is derived from a single driving-wheel.

That others may fully understood my invention, I will particularly describe it, having reference to the accompanying drawings, wherein—

Figure 1:
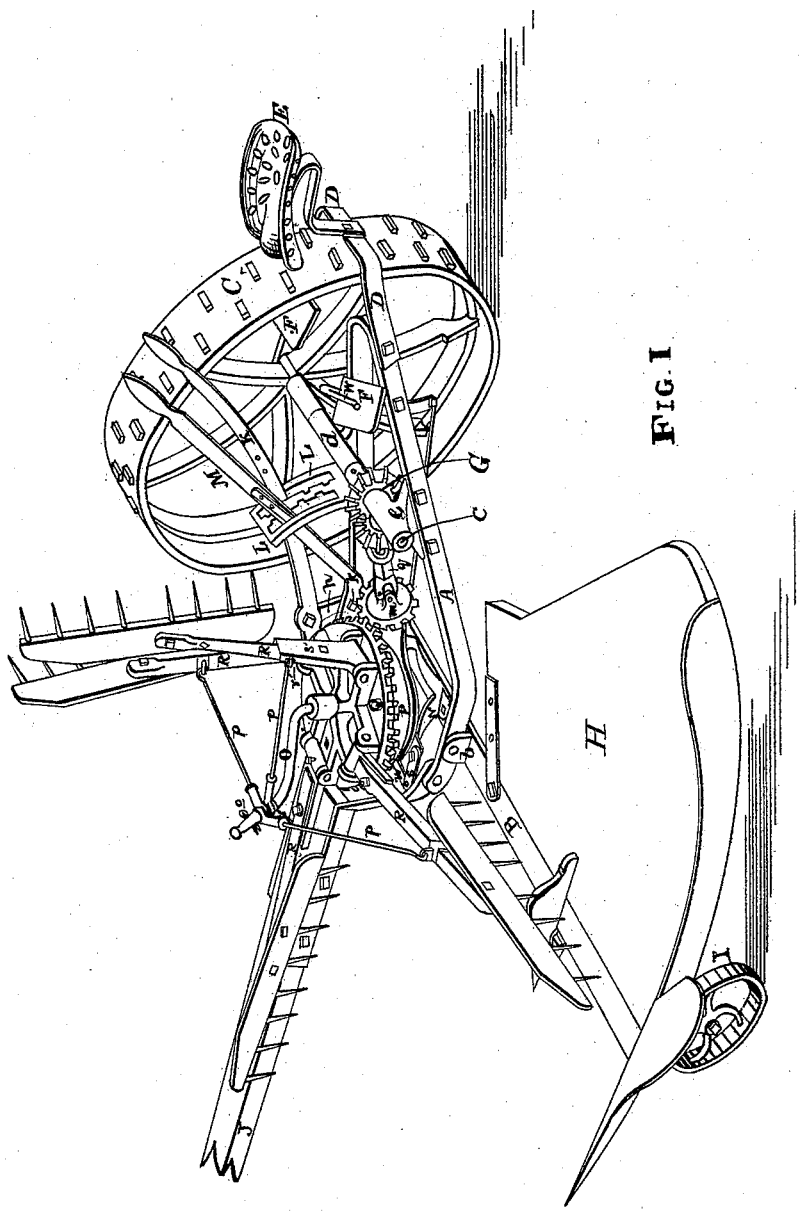
Figure 2:
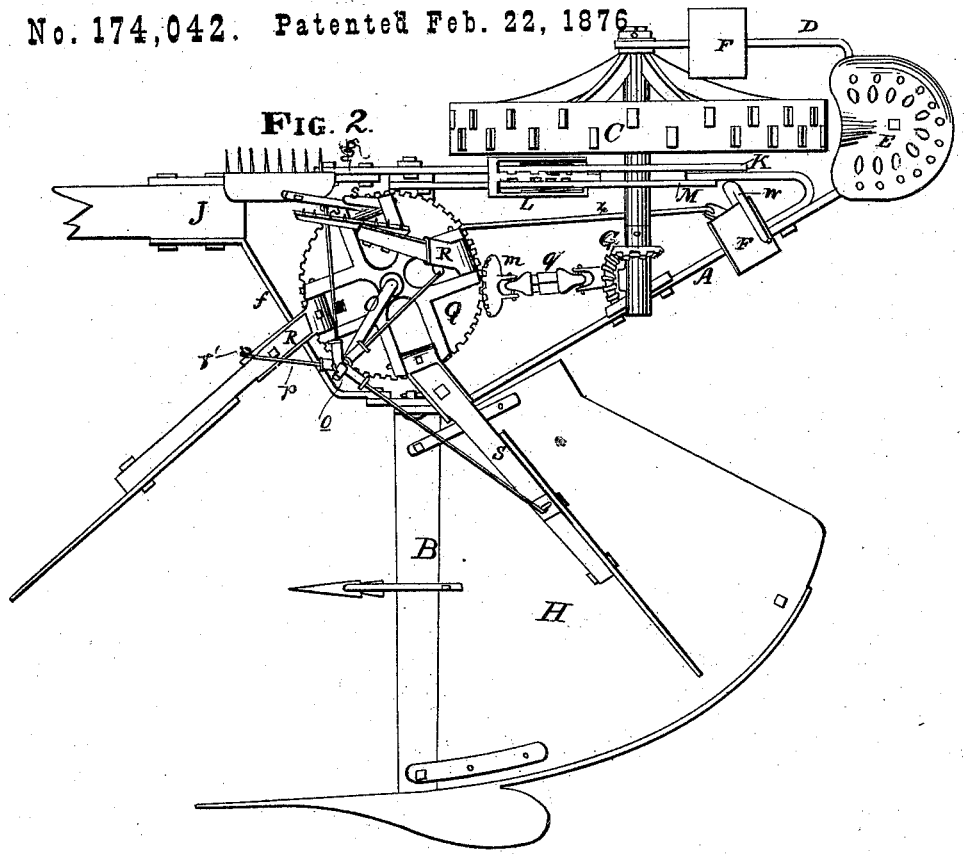
Figure 3:
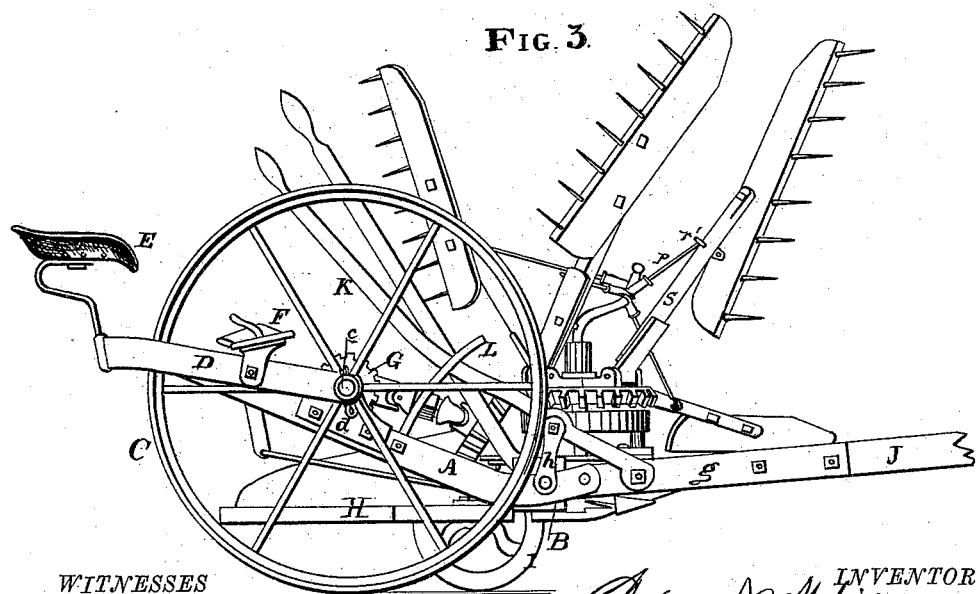
Figure 4:
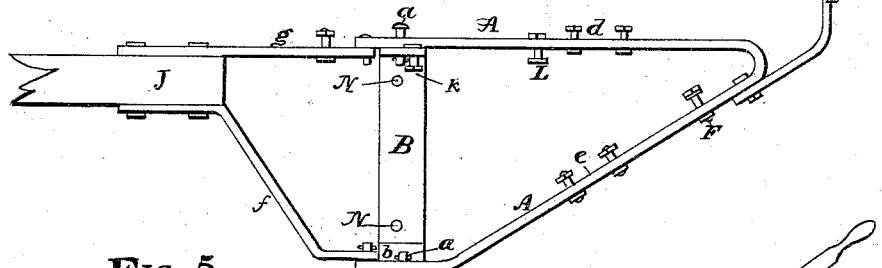
Figures 5, 6, 7:
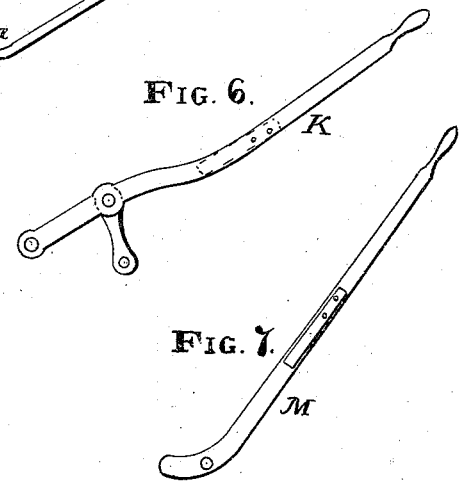
Figure 8:
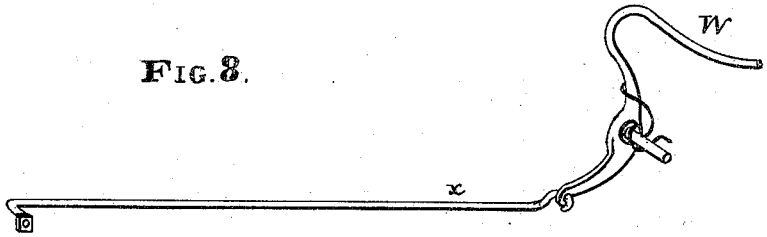
Figure 9:
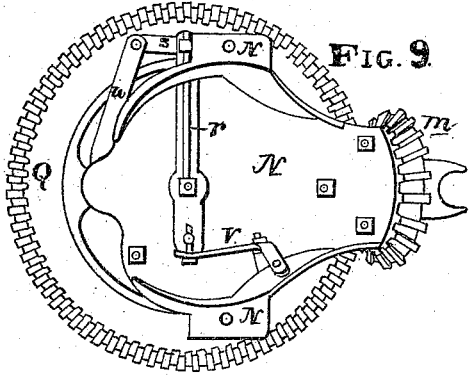
Figure 10:
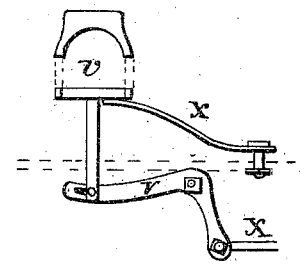
Figure 11:
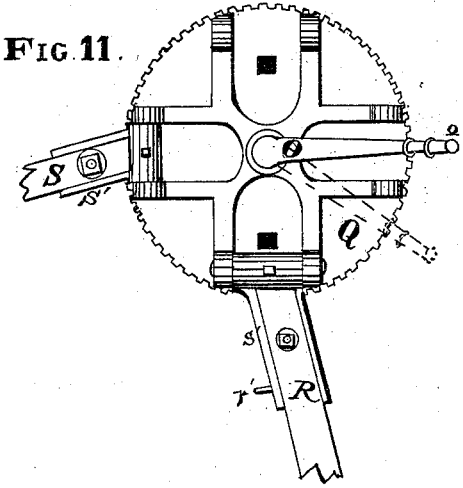
Figure 12:
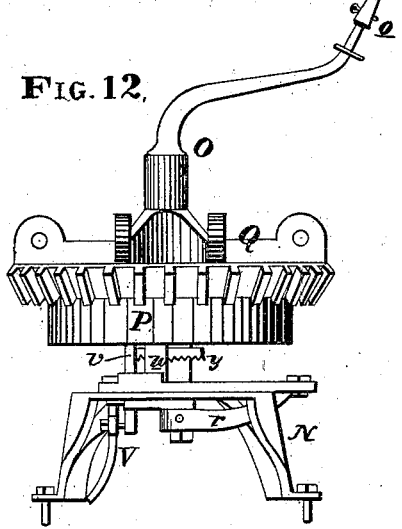
Figure 13:
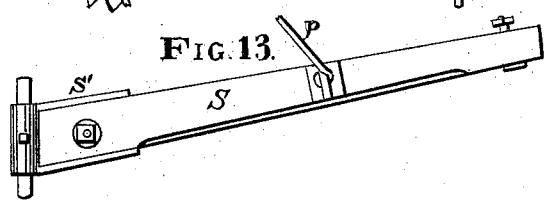
Figure 14:
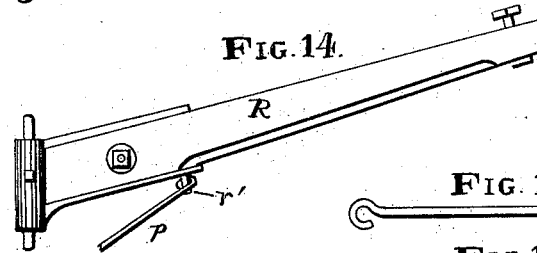
Figure 15:
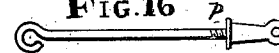
Figure 16:
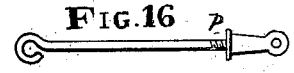
Figure 17:
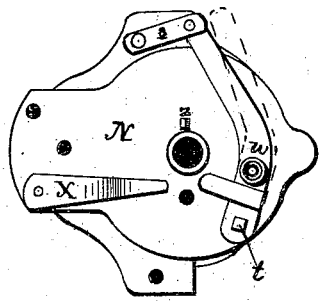
Figure 18:
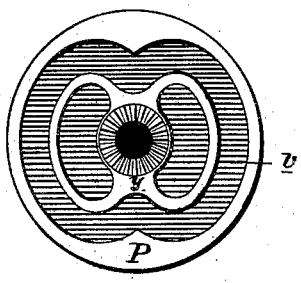
Figure 19:
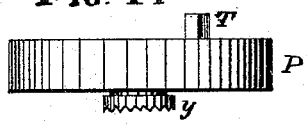
Figure 20:
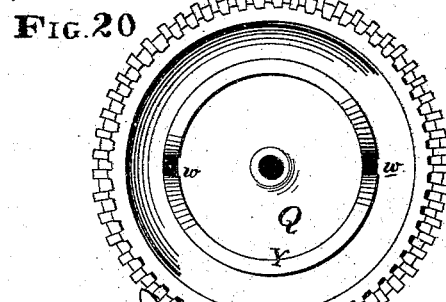
Figure 21:
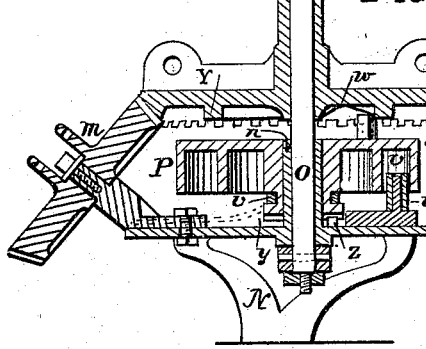
Figure 22:
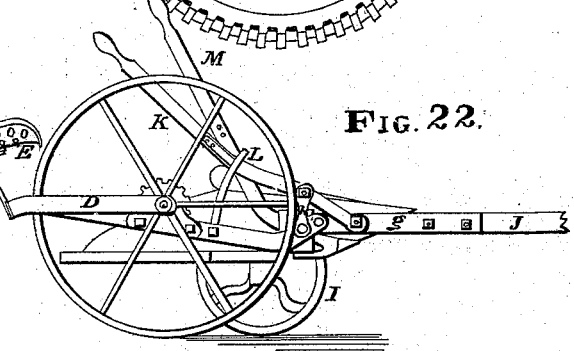
Figure 23:
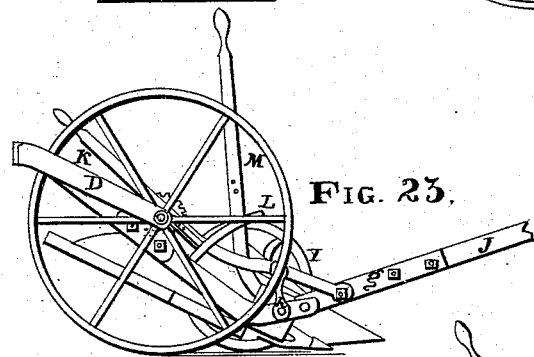
Figure 24:
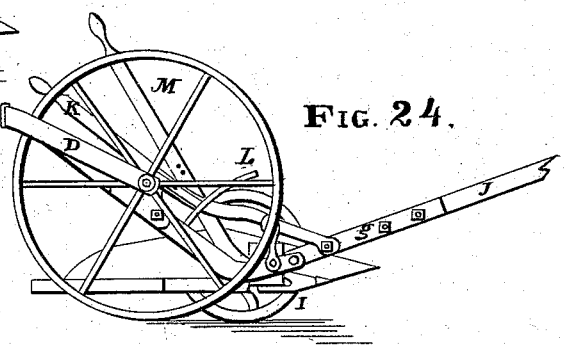
Figure 25:
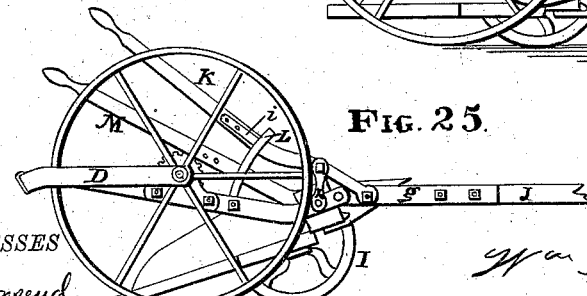

Figure 1 is a perspective view of my machine, with platform and automatic rake, arranged for reaping. Fig. 2 is a plan view of the same. Fig. 3 is an outer-side elevation of the same. Fig. 4 is a plan of the main frame and finger-beam. Fig. 5 is the segment-lever rack. Fig. 6 is the tongue-lever. Fig. 7 is the lever for tilting the finger-bar. Fig. 8 is the foot-lever and string-rod for controlling the rake and reel. Fig. 9 is a bottom plan of the rake-stand. Fig. 10 represents, in elevation, the device for raising and lowering the rake-wheel. Fig. 11 is a top plan of the rake-head wheel. Fig. 12 is a side elevation of the rake-stand. Fig. 13 is a reel or beater arm. Fig. 14 is a rake-arm. Figs. 15 and 16 represent rake and reel suspending rods. Fig. 17 is a plan of the cam-lever, which controls the eccentric rake and reel crank. Fig. 18 is a plan of the cam, which controls the eccentric crank cam-lever. Fig. 19 is an edge view of the same cam detached. Fig. 20 is a bottom plan of the rake-head wheel. Fig. 21 is a longitudinal section of the rake-stand. Fig. 22 is a side elevation, showing cutting apparatus raised from the ground to its highest point. Fig. 23 is a side elevation, showing cutting apparatus upon the ground and rear of platform elevated. Fig. 24 is a side elevation, showing the cutting apparatus near the ground and platform level. Fig. 25 is a side elevation, showing the cutting apparatus tilted upward.

The main frame A is composed of a single bar of wrought-iron corresponding to the perpendicular and hypotenuse of a right-angled triangle, the base of which is formed by the finger-bar B, the heel of which extends across the rear of said frame, and is secured thereto by two pivot-bolts, *a a*, one passing through the end of said finger-bar, which is bent up at right angles for the purpose, and the other through an angle-iron, *b*, bolted to the finger-beam for that purpose. The base of the triangular frame is toward the front. The main wheel C is outside of the main frame A and is mounted upon an axle, *c*, which rests in boxes *d e*, bolted, respectively, to the outer and inner sides of said main frame. An extension piece or brace, D, is also bolted securely to the rear end of said frame, and extends around the rear edge of the main wheel and forward to the outer end of the main axle, by which it is supported with a proper box. The driver's seat E is supported upon a leg bolted securely to the bar D at its rearmost part, and foot-boards F F are supported upon the main frame on the inner side, and upon the bar D on the outer side, so that the driver sits with a foot on either side of the main wheel.

The cutters derive their motion from a cog rim or gear bolted to the inner sides of the spokes to the main wheel C; but as no part of the present invention rests upon said cutting apparatus or its driving mechanism, the same is not shown. At the inner end of the main axle *c* a bevel-cog wheel, G, is rigidly secured to drive the rake and reel, which will be hereinafter described.

When employed for reaping, the usual quadrant-platform H is secured to the finger-bar, the outer end of which is supported upon the caster-wheel I. These parts, as well as the rake and reel, may be removed when the machine is to be employed in mowing. The tongue J is continued backward by two iron straps or braces, *f g*, the former of which is jointed to the inner side of the main frame at its forward extremity, and the latter is similarly jointed to the outer side of said frame. When released from control the finger-bar would rest upon the ground, and the rear end of the main frame would be correspondingly elevated, as shown in Fig. 25. The requisite control is obtained by means of the lever K, the forward end or fulcrum of which is jointed to the side of the brace $g$ a short distance in advance of its joint to the main frame, and said lever is connected to the main frame by a link, $h$, the bottom of which is jointed to said frame a little in rear of the tongue-joint. The rear end of said lever extends backward to a point near and convenient to the driver's hand when he is upon his seat. By elevating the rear end of said lever the tongue and main frame are brought into line, and as a consequence the front end of said lever and the finger-bar is elevated, because at front and rear of that point it has supports at fixed distances from the ground upon the axle $c$ and the necks of the horses. The lever K passes through a segment-rack, L, in any one of the notches whereof it may be caused to engage to hold it in any position desired, and a spring, $i$, upon the side of said lever causes it always to enter one of said notches when not forcibly restrained. The finger-bar B, being jointed to the front end of the main frame, is also susceptible of movement upon said joint to tilt or cant the points of the guard-fingers up or down, and this movement is made at the will of the driver by means of a lever, M, which is jointed to the inner side of the outer part of frame A at $b$ near its front end. The front end of said lever rests upon the finger-bar near its front edge, and the elevation of the rear end of said lever depresses the front edge of said finger-bar. The lever K also passes through the segment-rack L, which is provided with separate racks for both of the levers referred to, and it is held in place in a similar manner. The cutter and platform may, therefore, be made level at any elevation above the ground.

The rake-stand is supported upon an arch, N, the feet of which are bolted fast to the heel of the finger-bar between the forward ends of the main-frame bar A. The top of the arch N forms a flat table with a central hollow stud, $n$, the inner surface of which forms a bearing for the shaft of the eccentric crank O, and its outer surface forms a bearing for the cam-wheel P, whereby the movement of said eccentric crank is controlled. The rake-head wheel Q revolves on the shaft of the eccentric crank O above the cam-wheel P, and is caused to revolve by the driving-pinion $m$, which meshes with the cog-teeth on the periphery of said wheel Q. Said pinion $m$ takes its motion from the wheel G on the main axle through the telescopic tumbling-shaft $q$ with universal joint at each end, so that its operation is not disturbed by any irregularity of movement between the rake-stand and main wheel.

The rake and reel arms R S are jointed to the upper surface of the wheel Q, and as they revolve they alternately move horizontally over the platform, and then rise up to a position nearly or quite vertical, as they pass around toward the main frame. This irregular movement is accomplished by suspending said rake and reel arms from a point eccentric to their axis of revolution, and on the side toward the platform, so that, as the suspending-rods are inflexible in length, the rake-arms will be permitted to descend toward the platform, and be pulled up as they pass along the opposite side of their course. By imparting a movement to said eccentric point of suspension equal to the rotation of the wheel Q, the rake at that time passing above the platform will move in a horizontal plane, and will thus be enabled to sweep off the grain. The eccentric point of suspension is the end $o$ of the crank O, and the means of suspension are the rods $p$, which are adjustable in length by means of screw-caps. The requisite movement of the point of suspension is secured through the medium of the lever $r$ attached to the bottom of the shaft O, which lever is, by means of a link, S, attached to a lever, $l$, which is pivoted at $t$ to the arch-table N. Said lever $l$ is provided with a stud, $u$, which projects upward into, and engages with, the cam-groove $v$ of the cam-wheel P. As said cam-wheel revolves the lever periodically reciprocated, and a similar movement is imparted to the lever $r$ and eccentric crank O. It is desirable that the driver shall be able to control the rake, so that gavels of insufficient size shall not be removed from the platform, and without interfering with the movement of the reel. This effect is readily accomplished by causing the cam-wheel P to be driven by the rake-head wheel Q, and disconnected when it is desired that the raking should be discontinued, because such disconnection causes the point $o$ to remain stationary, and the rakes, therefore, cease to pass horizontally over the platform, but commence to rise up immediately on passing the vertical plane of the point $o$. The connection of the cam-wheel with the rake-head wheel is made by means of a stud, T, set in the top of the cam-wheel, and a corresponding socket, $w$, in the wheel Q, into which said stud enters. To disconnect the cam-wheel P from the wheel Q, the former is caused to descend until the stud T is clear of the socket $w$, and this is effected by a clutch-fork, U, operated by a bell-crank, V, which is controlled by the foot-lever W and string-rod or chain $x$. A spring, X, returns the cam-wheel to its engagement whenever it is released by taking pressure from the foot-lever. The wheel Q is provided with two of said sockets, $w$, at opposite points, so the engagement may be effected at each half revolution, and said sockets are connected by a circular rib or ridge, $y$, with inclined planes adjacent to the sockets $w$, so that when the stud T has been withdrawn a little way only, it will ride on said ridge or rib, and the cam-wheel will be automatically depressed its full distance. The object of this forcible depression is to cause a radially-serrated disk, $y$, at the bottom of the cam-wheel to engage with a small chisel-edged stud, $z$, or some equivalent engaging device, and thus lock said cam-wheel in position so long as it is depressed.

In practice, a simple depression of the lever

W will cause the disengagement of stud T, and the stoppage of the raking during one-half of one revolution, but said stoppage may be continued at the pleasure of the operator.

I claim—

1. A continuous revolving reel and rake, having an eccentric point of suspension which controls the movement of the rake over the platform periodically for the purpose of removing the gavel, in combination with a disengaging device, whereby the operator can at will disengage the mechanism, so that the eccentric point of suspension will stand at rest, and the rake act as a reel-beater only.

2. The main frame mounted upon and vibrating on the main-wheel axle, and a flexible tongue hinged thereto, with a controlling device whereby the driver can regulate the relative positions of said tongue and frame, combined with a cutting apparatus, finger-beam B, and platform and raking mechanism, connected together and hinged to the main frame so as to move in unison, substantially in the manner described, and provided with a controlling-lever, whereby the driver can, while the machine is in motion, vibrate the main frame and cutting apparatus up or down, or turn the cutting apparatus, platform, and raking mechanism up or down independent of the main frame to level the platform, at whatever height it may be.

3. In combination, a main frame having the driving-wheel outside of it, the main axle turning in boxes secured to each side of said frame, the rake's driving-gear between the side bars of said frame, combined with a revolving rake located upon the finger-beam likewise between said bars of said main frame, as set forth.

4. Combined with the main frame mounted and vibrating upon the main axle, a hinged tongue joined thereto with a controlling device, whereby the driver can raise or lower the front end of said frame, combined with a cutting apparatus connected to said main frame with a rolling joint, and the lever M, whereby the driver can control the relative positions of the main frame and cutting apparatus to level the cutters and platform, as set forth.

5. The triangular frame A, provided with a tongue, J, hinged to said frame, and cutting apparatus hinged with a rolling joint across the front or base end of said frame, combined with the lever K and its fulcrum-link h, lever M, and the holding-rack I, arranged substantially as described.

That I claim the above as my invention, witness my hand this 5th day of August, 1875.

WM. N. WHITELEY.

Witnesses:
FRANK C. GOODE,
P. W. KELLY.